United States Patent [19]

Osborne

[11] Patent Number: 4,876,505

[45] Date of Patent: Oct. 24, 1989

[54] APPARATUS AND METHOD FOR MONITORING STEAM TURBINE SHROUD CLEARANCE

[75] Inventor: Robert L. Osborne, Winter Springs, Fla.

[73] Assignee: Westinghouse Electric Corp., Pittsburgh, Pa.

[21] Appl. No.: 199,633

[22] Filed: May 27, 1988

[51] Int. Cl.$^4$ .......................... G01B 7/14; G01B 7/30; G01R 33/02

[52] U.S. Cl. ..................... 324/208; 73/660; 324/226; 324/233; 324/243

[58] Field of Search ............... 324/207, 208, 228, 226, 324/227, 225, 233, 234, 236–243, 260–262; 73/660, 661, 462, 654; 340/683, 679

[56] References Cited

U.S. PATENT DOCUMENTS

| | | | |
|---|---|---|---|
| 4,144,421 | 3/1979 | Sakai | 200/61.4 |
| 4,326,804 | 4/1982 | Mossey | 356/375 |
| 4,384,819 | 5/1983 | Baker | 415/14 |
| 4,395,827 | 8/1983 | Stowe et al. | 33/181 R |
| 4,422,333 | 12/1983 | Leon | 73/660 |
| 4,518,917 | 5/1985 | Oates et al. | 324/207 |
| 4,573,358 | 3/1986 | Luongo | 73/660 |
| 4,593,566 | 6/1986 | Ellis | 73/660 |
| 4,644,270 | 2/1987 | Oates et al. | 324/207 |
| 4,659,988 | 4/1976 | Goff et al. | 73/660 X |
| 4,758,964 | 7/1988 | Bittner et al. | 73/660 X |

FOREIGN PATENT DOCUMENTS

| | | | |
|---|---|---|---|
| 0168119 | 10/1982 | Japan | 73/660 |
| 0236827 | 11/1969 | U.S.S.R. | 324/207 |
| 0391410 | 7/1973 | U.S.S.R. | 73/660 |

OTHER PUBLICATIONS

Jones, "Development of a Noninterference Technique for Measuring Turbine Engine Rotor Blade Stresses", AIAA/SAE/ASME/ASEE 21st Joint Propulsion Conference, Jul. 1985, pp. 1–5.

Primary Examiner—Reinhard J. Eisenzopf
Assistant Examiner—Warren S. Edmonds
Attorney, Agent, or Firm—K. Bach

[57] ABSTRACT

A turbine blade shroud clearance monitoring system is comprised of a plurality of sensors for measuring the clearance between the stationary portion of the turbine and the shroud segments in each turbine blade row. The measurements are averaged by a microprocessor to produce an average clearance value for each shroud segment. The microprocessor then analyzes the average clearance values for each shroud segment to determine when the clearance between a shroud segment and the stationary portion of the turbine is approaching a critical value. Output responsive to the foregoing analysis is then generated.

26 Claims, 7 Drawing Sheets

APPARATUS AND METHOD FOR MONITORING STEAM TURBINE SHROUD CLEARANCE

BACKGROUND OF THE INVENTION

1. Field of the Invention

The present invention is directed generally to monitoring operating parameters in a steam turbine generator and, more specifically, to the monitoring of the clearance between the turbine shroud and the turbine seal.

2. Cross Reference to Related Application

The present application is related to U.S. application Ser. No. 201,225 entitled SHROUDED TURBINE BLADE VIBRATION MONITOR filed 6/2/88, which is assigned to the same assignee as the present invention (W.E. 54,116).

3. Description of the Prior Art

Apparatus exist for measuring various operating parameters in steam turbine generators. One such apparatus is disclosed in U.S. Pat. No. 4,644,270 wherein a plurality of proximity sensors measure steam flow guide to turbine blade top distance at various points around a flow guide. However, such an apparatus is not easily adaptable to a shrouded turbine blade arrangement.

A typical prior art shrouded turbine blade row 10 (FIG. 1) includes the following components: rotor disk 11, blades 12, shroud segments 13, tenons 14 and seal 15. The tenons 14 are integral parts of the blades 12 that serve to fasten the shroud segments 13 to the blades 12. The seal 15 reduces the amount of steam that passes around instead of through the turbine blades 12.

The clearance between the seal 15 and the shroud segments 13 must not be so great as to allow an excessive amount of steam to pass between them and thereby reduce the efficiency of the turbine. On the other hand, any contact between the shroud segments 13 and the seal 15 will result in both components being destroyed. Because of the dynamic nature of a steam turbine and the forces and temperatures involved, the clearance between the shroud segments 13 and the seal 15 varies during operation. Therefore, it is desirable to monitor this clearance on a real-time basis in order to prevent damage to the rotating machinery.

In an attempt to reduce the number of unscheduled outages in steam turbine generator systems and protect the integrity of the components of the turbine generator, use is made of monitoring systems which detect and alert operators of abnormal operating conditions. However, because of the physical differences between shrouded and unshrouded turbine blades, monitoring systems used on the latter are not easily adaptable for use on the former. Accordingly, a device is needed that will indicate when the clearance between the shroud segments 13 and seal 15 is approaching a minimum limit established by the risk of contact. The present invention fills the need for a turbine blade shroud clearance monitoring system.

SUMMARY OF THE INVENTION

The present invention is directed to a turbine blade shroud clearance monitoring system comprised of a means for measuring the clearance between the stationary portion of the turbine and the shroud segments in each turbine blade row a number of times along each shroud segment under dynamic conditions. The clearance measuring means is preferably a plurality of sensors. The system also includes means for averaging these measurements to produce an average clearance value for each shroud segment, means for analyzing the average clearance values for each shroud segment to determine when the clearance between a shroud segment and the stationary portion of the turbine is approaching a critical value, and output means responsive to the means for analyzing.

One embodiment of the present invention is directed to a turbine blade shroud clearance monitoring system in which the means for analyzing compares the average clearance value of each shroud segment to the average clearance values of the two adjacent shroud segments in the same row. A change in the clearance value of any one shroud segment is, thus, detected.

Another embodiment of the present invention is directed to a turbine blade shroud clearance monitoring system in which the means for analyzing computes an average row clearance value by averaging the average clearance values for each shroud segment in that particular row. The average clearance value for each shroud segment is compared to the average row clearance value in order to detect a reduction in clearance of a particular shroud segment.

According to another embodiment of the present invention, the analyzing means of a turbine blade shroud clearance monitoring system compares the average clearance value of each shroud segment to a predetermined critical clearance value. The approach of the average clearance value of any one shroud segment to this critical value is, thus, detected.

The present invention is also directed to a method of monitoring turbine blade shroud clearance by measuring the clearance between the stationary portion of the turbine and the shroud segments in each turbine blade row a number of times along each shroud segment under dynamic conditions. This method also includes the steps of averaging these measurements to produce an average clearance value for each shroud segment, analyzing the average clearance values for each shroud segment to determine when the clearance between a shroud segment and the stationary portion of the turbine is approaching a critical value, and outputting responses to this analysis.

The turbine blade shroud clearance monitor of the present invention may be used in any steam turbine utilizing shrouded turbine blades. In a typical steam turbine comprised of rows of high pressure, intermediate pressure and low pressure blades, all rotating rows with the exception of the last row in the low pressure turbine have a shroud at their outer periphery. The need for such a system exists because of the importance of maintaining the proper clearance between the shroud segments and the seal, which is the stationary portion of the turbine. The reduction of this clearance may cause contact between the shroud and the seal which results in their destruction. The turbine shroud clearance monitoring system will alert an operator of a critical condition in the clearance between the shroud and the seal and, thus, prevent the destruction of the turbine components. These and other advantages and benefits of the present invention will become apparent from the description of the preferred embodiments hereinbelow.

BRIEF DESCRIPTION OF THE DRAWINGS

In order that the present invention may be clearly understood and readily practiced, preferred embodiments will now be described, by way of example only, with reference to the accompanying figures wherein.

DETAILED DESCRIPTION OF THE PREFERRED EMBODIMENTS

Figure 1:
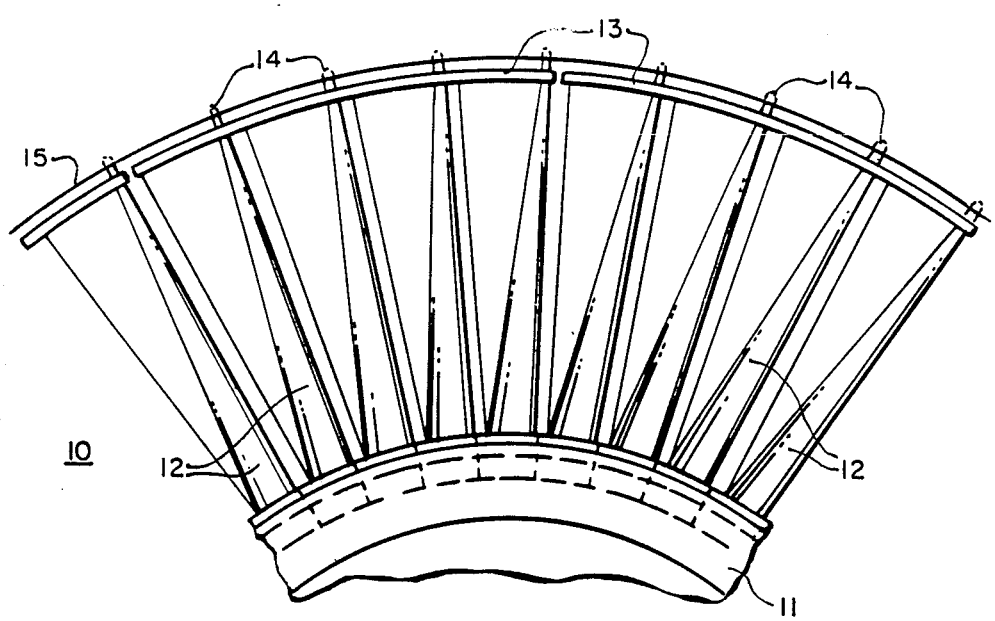
FIG. 1 illustrates a prior art shrouded turbine blade row.
Figure 2:
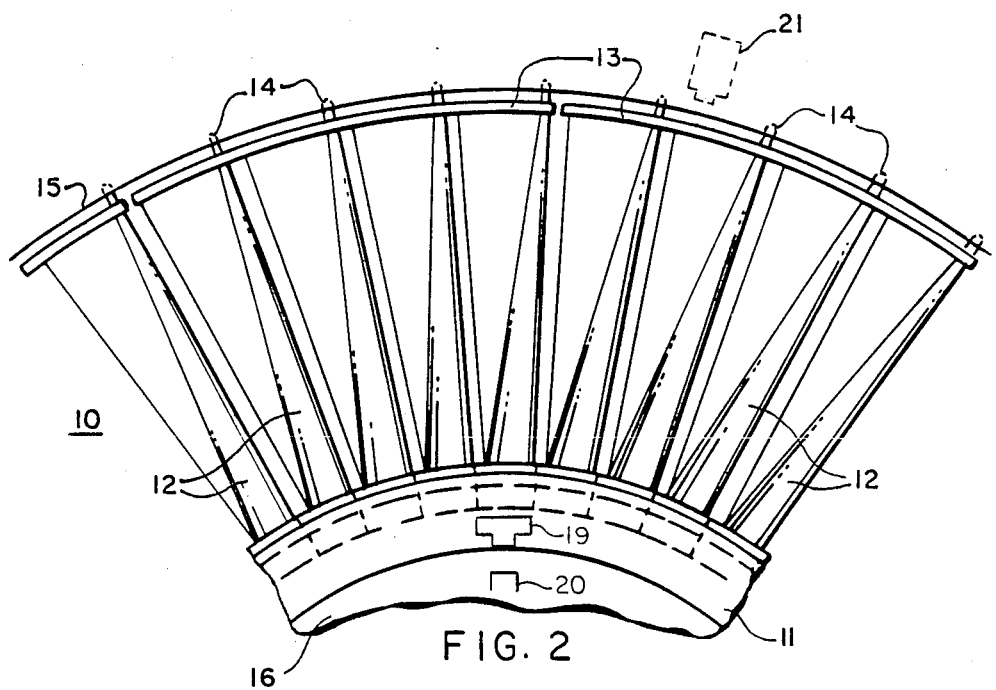
FIG. 2 illustrates a shrouded turbine blade row in conjuction with which the method and apparatus of the present invention may be used.

FIG. 2 illustrates a shrouded turbine blade row 10 in which the method and apparatus of the present invention to monitor the turbine shroud clearance can be employed. Like reference numerals are employed among the various figures to designate like elements As previously illustrated in FIG. 1, the turbine blades 12 are connected to a rotor 16 by means of the rotor disk 11. The tenons 14 are integral parts of the blades 12 and serve to fasten the shroud segments 13 to the blades 12. The seal 15 reduces the amount of steam that passes around instead of through the turbine blades 12. Also illustrated in FIG. 2 is a sensor 21, which is the means for measuring the clearance between the shroud segments 13 and the seal 15. The sensor 21 may be a variable reluctance sensor or may incorporate any practical method of sensing distance, including, but not limited to, microwave or optical methods. One type of sensor which can withstand the rigors of the interior of a steam turbine is described in U.S. Pat. No. 4,644,270. As further illustrated in FIG. 2, a reference sensor 19 is additionally provided. The sensor 19 in conjunction with indicia 20 on the rotor 16 is operable to provide an output signal once per rotor 16 revolution and is the means for identifying a particular shroud segment 13. Such a reference signal is commonly known in the turbine art.

Figure 3:
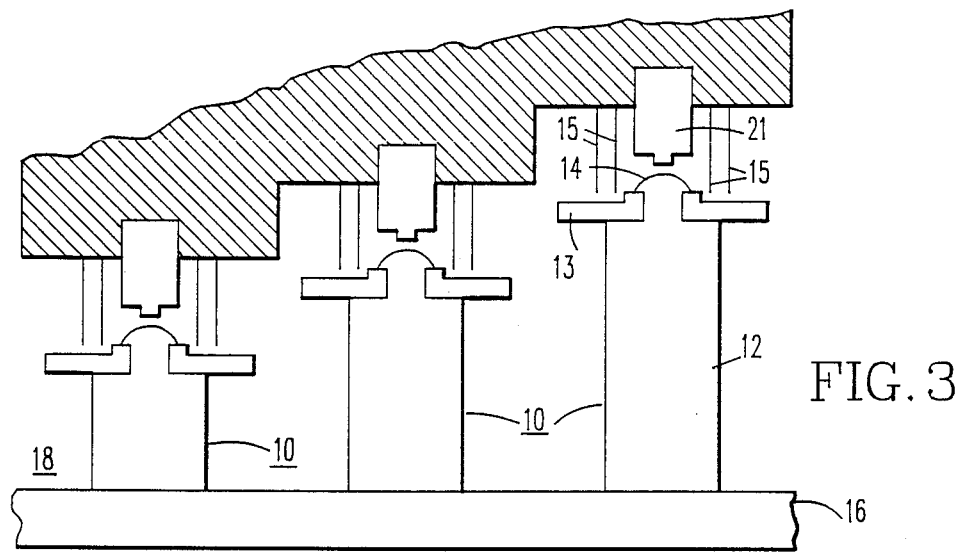
FIG. 3 illustrates a cross-sectional view of a steam turbine in conjunction with which the method and apparatus of the present invention may be used.

One sensor 21 is provided for each turbine blade row 10 of the steam turbine 18 illustrated in FIG. 3. The rotor 16 carries a plurality of turbine blade rows 10 consisting of blades 12 of differing sizes corresponding to the high pressure, intermediate pressure and low pressure stages of the turbine 18. The turbine seal arrangement 15 encompasses all blade rows 10.

Figure 4:
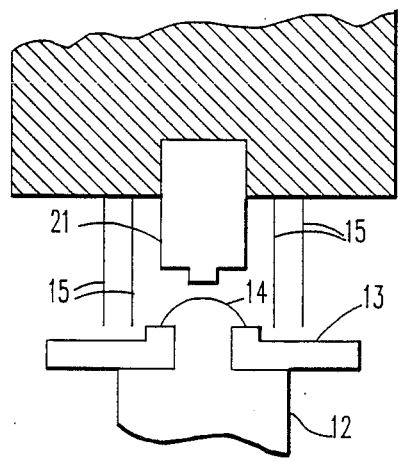
FIG. 4 illustrates a cross-sectional view of the turbine blade row arrangement of FIG. 2.

A cross-sectional view of a portion of the turbine blade row 10 arrangement of FIG. 2 is shown in FIG. 4. The sensor 21 is situated in the plane of the blade row 10 and directly above the shroud segment 13 and tenon 14 surface. The placement of the sensor 21 outside of the direct flow path of the steam through the turbine blades 12 prevents significant erosion of the sensor 21. Because the position of the seal strips 15 relative to the sensor 21 does not change and the sensor 21 measures the distance from its edge to the shroud segment 13, the shroud segment 13 to seal 15 clearance can be determined.

Figure 5:
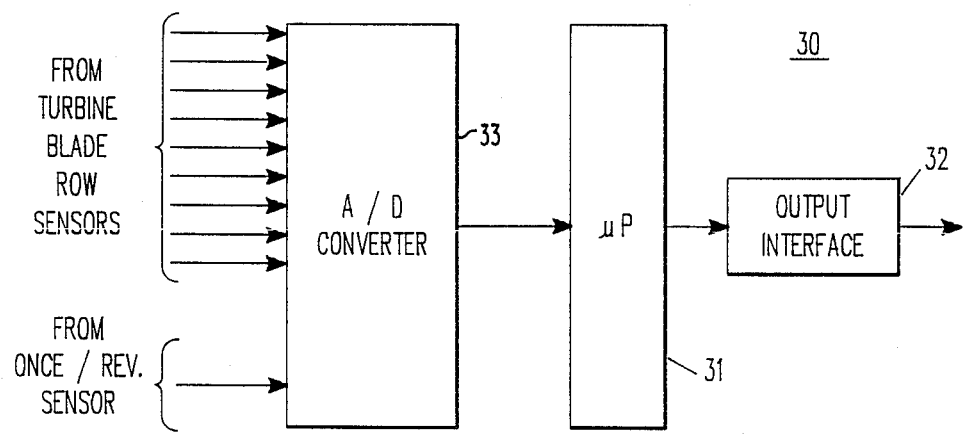
FIG. 5 illustrates a turbine blade shroud clearance monitoring system constructed according to the teachings of the present invention.

The turbine shroud clearance monitoring system 30 of the present invention is illustrated in FIG. 5. The clearance between the shroud segment 13 and seal 15 as measured by sensor 21 of FIG. 2 is converted to a digital signal by the analog to digital converter 33 which is then sampled by the microprocessor 31. The microprocessor 31 is the means for both averaging and analyzing these measurements and is also capable of displaying shroud clearance data to operating personnel as well as initiating turbine protective action through the output interface 32.

Figure 6:
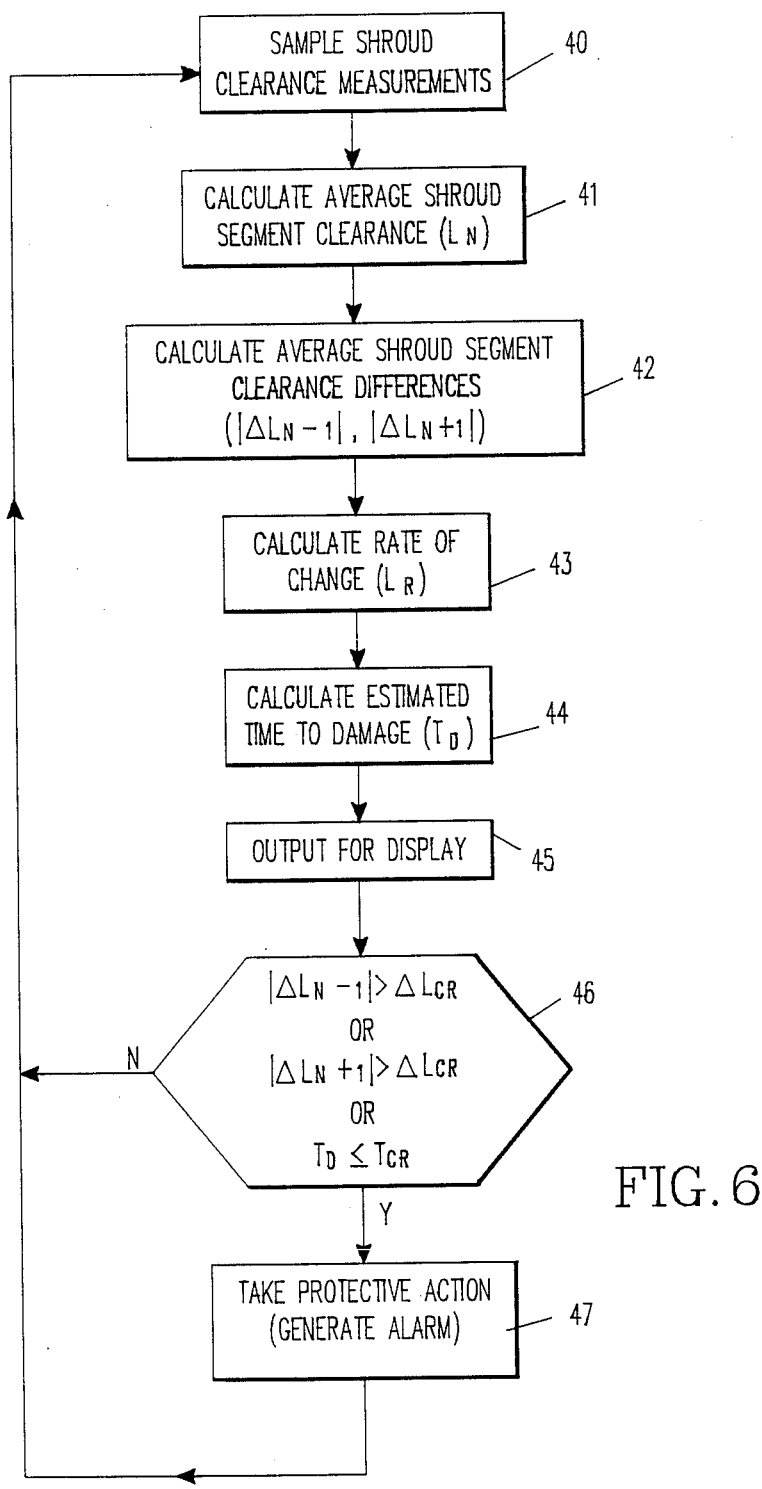
FIG. 6 is a flow chart illustrating the steps performed by the microprocessor of the turbine blade shroud clearance monitoring system shown in FIG. 5.

The operation of system 30 shown in FIG. 5 may be implemented as illustrated in the flow chart of FIG. 6. The flow chart begins at step 40 where the microprocessor 31 of FIG. 5, through known data acquisition techniques, samples the shroud clearance measurements a number of times circumferentially along each shroud segment 13 under dynamic conditions through sensor 21 of FIG. 2. The measurements sampled will be indicative of the shroud-tenon-shroud-tenon-shroud-gap pattern that is characteristic of the shroud segment 13 surface of FIG. 2. Because the height of the tenons 14 is greater than the height of the shroud segments 13 and because the shroud segments 13 may deform sufficiently to contact the seal 15 without getting higher than the tenons 14, the minimum clearance measured is not indicative of the actual clearance between the shroud segment 13 surface and the seal 15. Thus, a number of measurements per shroud segment 13 must be made and an average clearance value ($L_N$) representative of the distance between the shroud segment 13 surface and the seal 15 is calculated by the microprocessor 31 in step 41 of the flow chart in FIG. 6. The measurement sampling rate must be high enough (three or four samples between tenons 14) so as to both obtain a representative average of the shroud segment 13 surface to seal 15 distance and clearly indicate the edge of a tenon 14 so that these measurements are not used in the calculation of the average clearance ($L_N$)

Figure 11A:
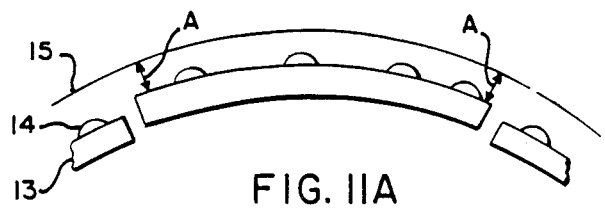
FIGS. 11A and 11B illustrate both even and uneven turbine blade shroud deformation, respectively.
Figure 11B:
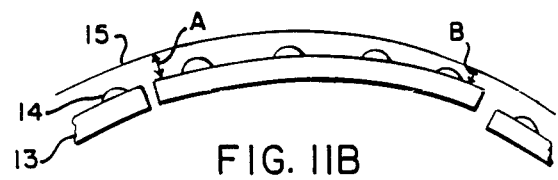

It is important to note that the average clearance value ($L_N$) may not be representative of the minimum distance between the shroud segment 13 surface and the seal 15 in the situation where the shroud segment 13 deforms unevenly. FIG. 11A illustrates the condition where the shroud segment 13 deforms evenly and the distances A are equal on both sides of the shroud segment 13 while FIG. 11B illustrates the condition where the shroud segment 13 deforms unevenly and the distance B on one end of the shroud segment 13 is less than the distance A on the other end of the shroud segment 13. In the situation where uneven shroud segment 13 deformation occurs, the minimum shroud segment 13 surface to seal 15 distance between any two tenons 14 on the shroud segment 13 must be used as the average clearance value ($L_N$) for that shroud segment 13. The microprocessor 31 will determine, in step 41 of the flow chart in FIG. 6, whether the individual shroud segment 13 surface to seal 15 distance measurements indicate uneven shroud segment 13 deformation and then substitute the minimum shroud segment 13 surface to seal 15 distance for the average clearance value ($L_N$).

In order to discriminate between changes in the average clearance value ($L_N$) due to either a change in shroud segment 13 to seal 15 clearance or a change in position of the turbine rotor 16, the microprocessor 31, in step 42, calculates the differences ($\Delta L_{N-1}$, $\Delta L_{N+1}$) between the average shroud segment clearance ($L_N$) and the average shroud segment clearance values ($L_{N-1}$, $L_{N+1}$) for the two adjacent shroud segments 13. The rate of change ($L_R$) between the average shroud segment clearance ($L_N$) and the average shroud segment clearance values ($L_{N-1}$, $L_{N+1}$) for the two adjacent shroud segments 13 is calculated in step 43. In step 44, the time to damage ($T_D$) is estimated by the microprocessor 31 using the equation $T_D = |1/L_R| \times L_N$ where $L_R$ is the rate of change just described and $L_N$ is the average shroud segment clearance. $L_R$ is constrained to negative values which correspond to decreasing average shroud segment clearance values ($L_N$). The absolute value of the clearance difference values ($\Delta L_{N-1}$, $\Delta L_{N+1}$), the rate of change ($L_R$) and the estimated time to damage ($T_D$) are output for display in step 45 in order to alert the operator of any further change in the difference between the average shroud segment clearance ($L_N$) and the average shroud segment clearance values ($L_{N-1}$, $L_{N+1}$) of the two adjacent shroud segments 13.

The microprocessor 31 compares, in step 46, the absolute value of the clearance difference values ($\Delta L_{N-1}$, $\Delta L_{N+1}$) to a critical clearance difference value ($\Delta L_{CR}$) which corresponds to a deviation of the average shroud segment clearance ($L_N$) from the average shroud segment clearance values ($L_{N-1}$, $L_{N+1}$) for the two adjacent shroud segments 13 at which the risk of contact between the shroud segment 13 and seal 15 becomes significant. Initially, the critical clearance difference value ($\Delta L_{CR}$) may be set at 0.75 to 1 mm (30 to 40 mils). The microprocessor 31 also compares, in step 46, the estimated time to damage ($T_D$) to a critical time to damage ($T_{CR}$) which corresponds to the minimum time until damage before which protective action must be initiated in order for the protective action to be effective in preventing turbine 18 damage. The critical clearance difference value ($\Delta L_{CR}$) and the critical time to damage ($T_{CR}$) are stored in a data base structure. If either of these comparisons indicates a shroud clearance difference ($\Delta L_{N-1}$, $\Delta L_{N+1}$) greater than the critical clearance difference value ($\Delta L_{CR}$) or an estimated time to damage ($T_D$) less than or equal to the critical time to damage ($T_{CR}$), the microprocessor 31 initiates the protective actions of step 47 by generating an operator alarm and then returns program control to step 40. Otherwise, program control returns directly to step 40. This process is performed for each shroud segment 13 of each turbine blade row 10.

Figure 7:
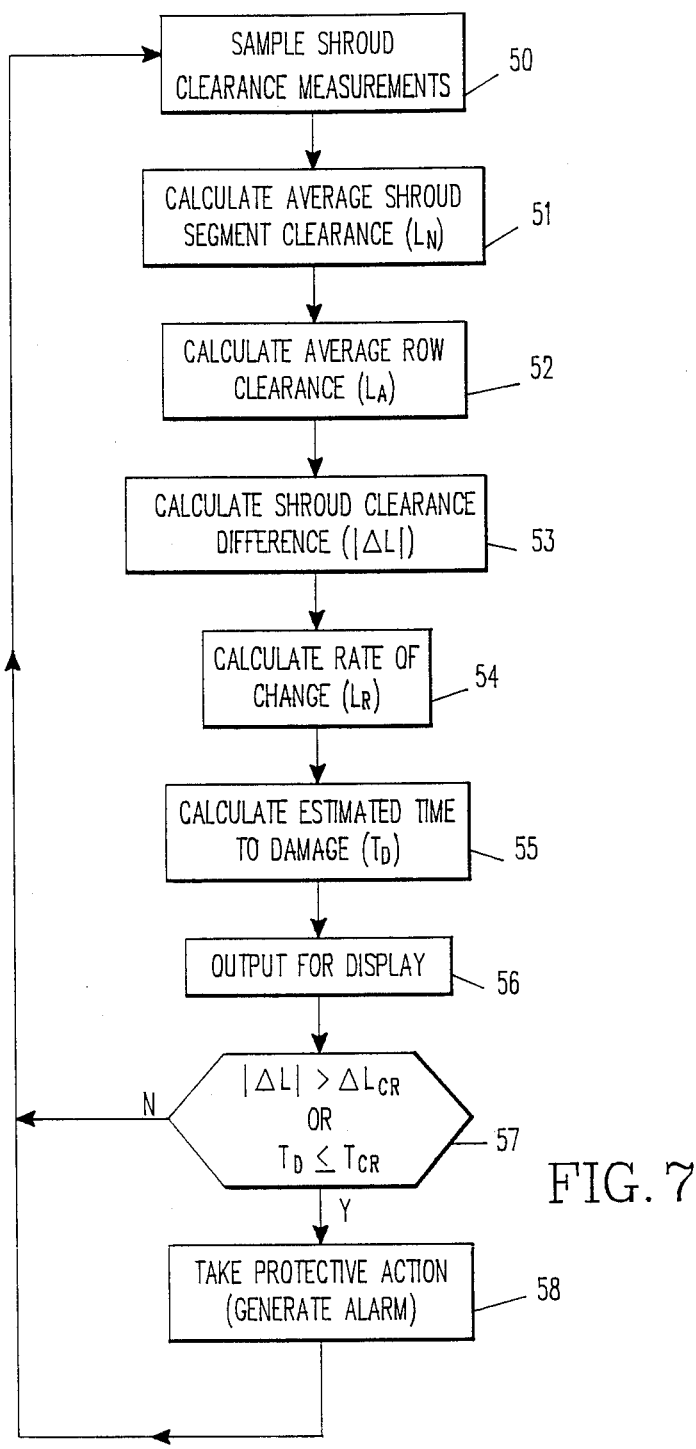
FIG. 7 is a flow chart illustrating an alternate embodiment of the steps performed by the microprocessor of the turbine blade shroud clearance monitoring system shown in FIG. 5.
Figure 8:
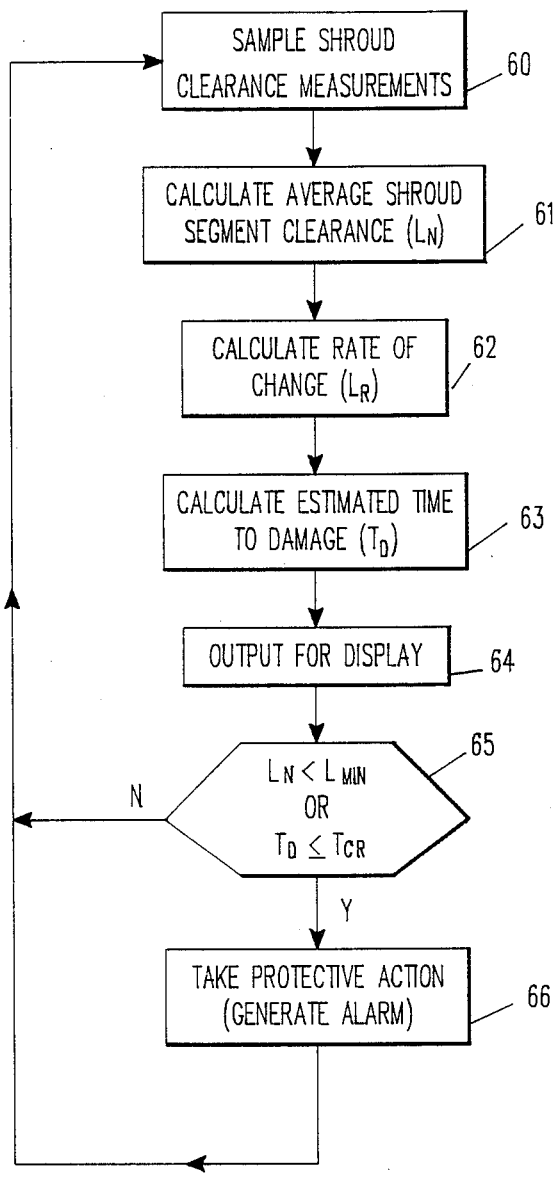
FIG. 8 is a flow chart illustrating an alternate embodiment of the steps performed by the microprocessor of the turbine blade shroud clearance monitoring system shown in FIG. 5.

The flow charts of FIG. 7 and FIG. 8 illustrate alternate embodiments of the present invention with respect to the determination of a critical change in the shroud segment 13 to seal 15 distance of FIG. 2. Steps 50 and 51 of FIG. 7 and steps 60 and 61 of FIG. 8 are identical to steps 40 and 41, respectively, of FIG. 6. In step 52 of FIG. 7, the microprocessor 31 of FIG. 5 calculates an average row clearance ($L_A$). The difference ($\Delta L$) between the average row clearance ($L_A$) and the average shroud segment clearance ($L_N$) is then calculated in step 53. The rate of change ($L_R$) between the average shroud segment clearance ($L_N$) and the average row clearance ($L_A$) is calculated in step 54. In step 55, the time to damage ($T_D$) is estimated by the microprocessor 31 as previously described in relation to FIG. 6. The absolute value of the shroud clearance difference ($\Delta L$), the rate of change ($L_R$) and the estimated time to damage ($T_D$) are output for display in step 56 in order to alert the operator of any further change in the diference between the average shroud segment clearance ($L_N$) and the average row clearance ($L_A$).

The microprocessor 31 compares, in step 57, the absolute value of the shroud clearance difference ($\Delta L$) to the critical clearance difference value previously described in relation to FIG. 6. The microprocessor 31 also compares, in step 57, the estimated time to damage ($T_D$) to the critical time to damage ($T_{CR}$) also described in relation to FIG. 6. If either of these comparisons indicates a shroud clearance difference ($\Delta L$) greater than the critical clearance difference value ($\Delta L_{CR}$) or an estimated time to damage ($T_D$) less than or equal to the critical time to damage ($T_{CR}$), the microprocessor 31 initiates the protective actions of step 58 by generating an operator alarm and then returns program control to step 50. Otherwise, program control returns directly to step 50. This process is performed for each shroud segment 13 of each turbine blade row 10.

Turning now to the flow chart of FIG. 8, the microprocessor 31 of FIG. 5, in step 62, calculates the rate of change ($L_R$) between the average shroud segment clearance ($L_N$) and a predetermined minimum critical clearance value ($L_{MIN}$) The minimum critical clearance value ($L_{MIN}$) corresponds to the shroud segment 13 to seal 15 clearance at which the risk of contact between the shroud segment 13 and seal 15 becomes significant. The minimum critical clearance value ($L_{MIN}$) is stored in a data base structure. In step 63, the time to damage ($T_D$) is estimated by the microprocessor 31 as previously described in relation to FIG. 6. The average shroud segment clearance ($L_N$), the rate of change ($L_R$) and the estimated time to damage ($T_D$) are output for display in step 64 in order to alert the operator of any further change in the difference between the average shroud segment clearance ($L_N$) and the predetermined minimum critical clearance value ($L_{MIN}$).

The microprocessor 31 compares, in step 65, the average shroud segent clearance ($L_N$) to the minimum critical clearance value ($L_{MIN}$). The microprocessor 31 also compares, in step 65, the estimated time to damage ($T_D$) to the critical time to damage ($T_{CR}$) previously described in relation to FIG. 6. If either of these comparisons indicates an average shroud segment clearance ($L_N$) less than the minimum critical clearance value ($L_{MIN}$) or an estimated time to damage ($T_D$) less than or equal to the critical time to damage ($T_{CR}$), the microprocessor 31 initiates the protective actions of step 66 by generating an operator alarm and then returns program control to step 60. Otherwise, program control returns directly to step 60. This process is performed for each shroud segment 13 of each turbine blade row 10.

In either of the last two embodiments of the invention just described, it may be necessary to provide a second sensor 21 in a diametrically opposite position to the first sensor 21 in order for the microprocessor 31 to identify cases where the center line of the rotor 16 has moved relative to the center line of the turbine seal 15. A corresponding increase in the average shroud segment clearance ($L_N$) of the shroud segment 13 diametrically opposite to a shroud segment 13 experiencing a decrease in average shroud segment clearance ($L_N$) indicates movement of the center line of the rotor 16 rather than a reduction and the seal 15. Four sensors 21 spaced at 90 degree intervals around the seal 15 circumference will detect both horizontal and vertical movement of the rotor 16.

Figure 9:
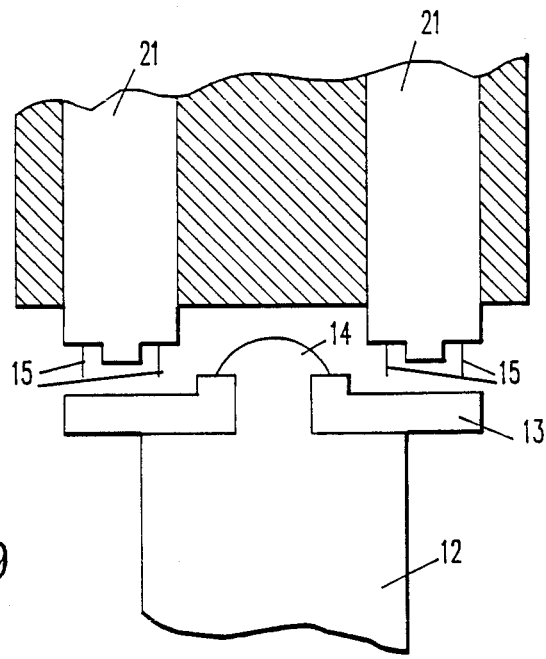
FIG. 9 illustrates a cross-sectional view of an alternate embodiment of the turbine blade row arrangement of FIG. 2.

Differential expansion, that is, a shifting of the steam turbine 18 of FIG. 3 along its axis due to expansion of the turbine rotor 16 relative to the turbine seal 15 can create problems with respect to the application of the system 30 of this invention. The shroud segment 13 may be shifted out from under the sensor 21. An alternate embodiment of this invention, illustrated in FIG. 9, is designed to compensate for the problems associated with differential expansion. FIG. 9 is a cross-sectional view of the turbine blade row 10 arrangement similar to the arrangement depicted in FIG. 4. This embodiment of the invention, however, utilizes two sensors 21, each of them situated within the seal 15 in the plane of the turbine blade row 10. The positioning of the sensors 21 within the seal 15 ensures that at least one sensor 21 will always be positioned above a portion of the shroud segment 13 even in the most severe cases of differential expansion. Two sensors 21 are provided for each turbine blade row 10 of the steam turbine 18.

Figure 10:
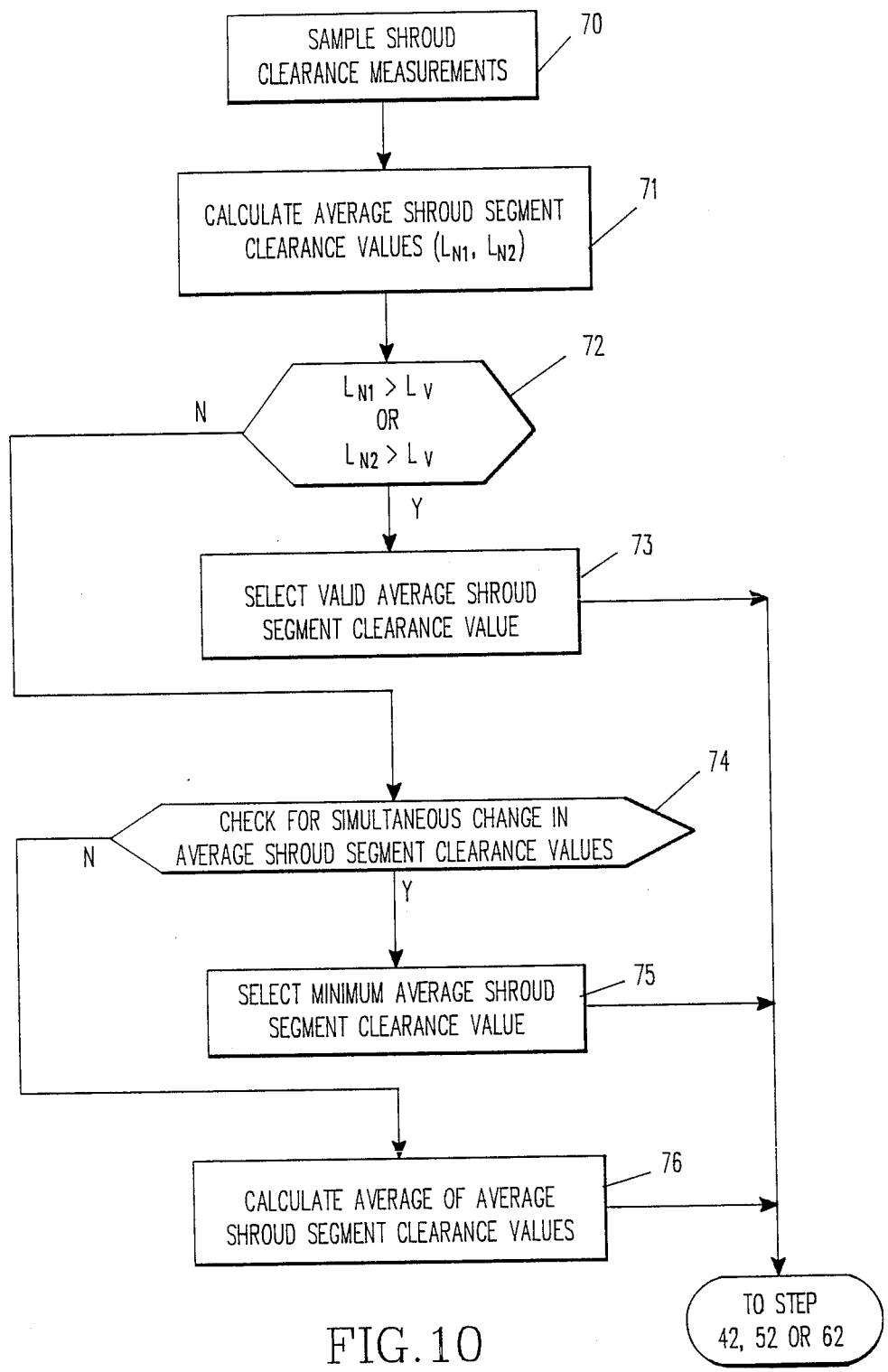
FIG. 10 is a flow chart illustrating the steps performed by the microprocessor of the turbine blade shroud clearance monitoring system shown in FIG. 5 in conjunction with the turbine blade row arrangement shown in FIG. 9.

The operation of system 30 shown in FIG. 5 in conjunction with the embodiment of the invention as depicted in FIG. 9 may be implemented as illustrated in the flow chart of FIG. 10. The flow chart begins at step 70 where the microprocessor 31 of FIG. 5, through known data acquisition techniques, samples the shroud clearance measurements a number of times along each shroud segment 13 under dynamic conditions through each of the sensors 21 of FIG. 9. Average shroud segment clearance values ($L_{N1}$, $L_{N2}$) are calculated in step 71 corresponding to the shroud clearance measurements sampled by each of the sensors 21. In step 72, the average shroud segment clearance values ($L_{N1}$, $L_{N2}$) are compared to a clearance validity value ($L_V$) which corresponds to a maximum valid clearance reading based upon the minimum outer dimensions of the turbine blades 12 and shroud segments 13. The clearance validity value ($L_V$) is stored in a data base structure. An average shroud segment clearance value ($L_{N1}$, $L_{N2}$) greater than the blade row 10 has shifted completely out from underneath the sensor 21 thus rendering invalid the average shroud segment clearance value ($L_{N1}$, $L_{N2}$) corresponding to that sensor 21. If this comparison indicates an average shroud segment clearance value ($L_{N1}$, $L_{N2}$) greater than the clearance validity value (LV), program control continues with step 73 where the valid average shroud segment clearance value ($L_{N1}$, $L_{N2}$) is selected. Program control then continues with one of the steps 42, 52 or 62 of one of the flow charts of FIGS. 6, 7 or 8, respectively.

If neither average shroud segment clearance value ($L_{N1}$, $L_{N2}$) is determined to be invalid from the comparison in step 72, program control continues with step 74 where the microprocessor 31 analyzes the average shroud segment clearance values ($L_{N1}$, $L_{N2}$) in order to detect a simultaneous change in these values. A simultaneous change in the average shroud segment clearance values ($L_{N1}$, $L_{N2}$) indicates that the turbine blade row 10 has moved in relation to both of the sensors 21 within a plane perpendicular to the plane of the seal 15. This is significant in relation to the embodiment of the invention illustrated in FIG. 9 in that movement of the shroud segment 13 within a plane perpendicular to the plane of the seal 15 will result in one sensor 21 detecting clearance values greater than the actual shroud segment 13 surface to seal 15 clearance because of the placement of the sensors 21 at the outer portion of the shroud segment 13. If a simultaneous change in the average shroud segment clearance values ($L_{N1}$, $L_{N2}$) has occurred, then the microprocessor 31, in step 75, selects the lesser of the two average shroud segment clearance values ($L_{N1}$, $L_{N2}$) which is representative of the actual shroud segment 13 surface to seal 15 clearance. Program control then continues with one of the steps 42, 52 or 62 of one of the flow charts of FIGS. 6, 7 or 8, respectively. If a simultaneous change in the average shroud segment clearance values ($L_{N1}$, $L_{N2}$) has not occurred, the microprocessor 31, in step 76, averages the average shroud segment clearance values ($L_{N1}$, $L_{N2}$) in order to obtain a single average shroud segment clearance value ($L_N$) Program control then continues with one of the steps 42, 52 or 62 of one of the flow charts of FIGS. 6, 7, or 8, respectively.

While the present invention has been described in connection with an exemplary embodiment thereof, it will be understood that many modifications and variations will be readily apparent to those of ordinary skill in the art. This disclosure and the following claims are intended to cover all such modifications and variations.

I claim as my invention:

1. A system for monitoring the clearance between a plurality of turbine blade shroud segments configured in a row and a stationary portion of a turbine, comprising;
   means for measuring the clearance between the stationary portion of the turbine and each of the shroud segments a number of times along each shroud segment under dynamic conditions;
   means for averaging said measurement to produce an average clearance value for each shroud segment;
   means for analyzing said average clearance values for each shroud segment to determine when the clearance between a shroud segment and the stationary portion of the turbine is approaching a critical value; and
   means for developing control signals in response to said means for analyzing.

2. The system of claim 1 wherein said means for analyzing includes means for comparing said average clearance value for each shroud segment to said average clearance values for the two adjacent shroud segments in the row.

3. The system of claim 2 wherein said means for analyzing additionally calculates the rate of change between said average clearance value for each shroud segment and said average clearance values for the two adjacent shroud segments in the row along with an estimate of the corresponding time until contact occurs between the shroud segment and the stationary portion of the turbine.

4. The system of claim 1 wherein said means for analyzing includes means for averaging all of said clearance values for the row to produce an average row clearance value which is compared to said average clearance value for each shroud segment.

5. The system of claim 4 wherein said means for analyzing additionally calculates the rate of change between said average clearance value for each shroud segment and said average row clearance value along with an estimate of the corresponding time until contact occurs between the shroud segment and the stationary portion of the turbine.

6. The system of claim 1 wherein said means for analyzing includes memory means for storing a predetermined critical clearance value which is compared to said average clearance value for each shroud segment.

7. The system of claim 6 wherein said means for analyzing additionally calculates the rate of change between said average clearance value for each shroud segment and said predetermined critical clearance value along with an estimate of the corresponding time until contact occurs between the shroud segment and the stationary portion of the turbine.

8. The system of claim 1 wherein said means for measuring said clearance includes a sensor positioned in a plane of the row along a line parallel to an axis of rotation of the turbine.

9. The system of claim 1 wherein the shroud segment has surface characteristics and wherein said means for averaging includes computer means for calculating said average clearance value for each shroud segment by discriminating between the measurements corresponding to various turbine blade shroud surface characteristics.

10. The system of claim 9 wherein the shroud segments carry a plurality of turbine blade tenons on the surface thereof, and wherein the shroud segment surface characteristics include the turbine shroud area and the turbine blade tenons.

11. The system of claim 1 wherein said means for measuring said clearance includes two sensors for the row positioned within the stationary portion of the turbine along a line parallel to an axis of rotation of the turbine.

12. The system of claim 11 wherein the turbine includes a turbine blade rotor and wherein said system is additionally comprised of means for determining whether, due to axial expansion of the turbine blade rotor, the row has shifted out from under one of said sensors such that measurements from the other of said sensors are used by said system.

13. The system of claim 11 additionally comprising means for determining whether the shroud segment has moved in relation to both of said sensors within a plane perpendicular to a plane of the stationary portion of the turbine such that the minimum of said measurements is used by said system.

14. The system of claim 1 wherein said means for measuring said clearance includes four sensors for the row positioned in a plane of the row along a line parallel to an axis of rotation of the turbine at 90 degree intervals around the circumference of the stationary portion of the turbine.

15. The system of claim 1 additionally comprising a plurality of turbine blade rows and a plurality of turbine seals encompassing the rotating shrouds and wherein said means for measuring said clearance includes a sensor for each row positioned in a plane of the row along a line parallel to an axis of rotation of the turbine.

16. The system of claim 1 wherein said means for developing control signals includes means for initiating turbine protective action in response to said means for analyzing.

17. The system of claim 16 wherein said means for initiating turbine protective action includes means for generating operator alarms in response to said means for analyzing.

18. A steam turbine having a shroud clearance monitoring system, comprising:
a shaft carrying rows of high pressure turbine blades, intermediate pressure turbine blades, and low pressure turbine blades;
a plurality of turbine blade shroud segments carried on the ends of said turbine blades;
a plurality of tenons which secure said turbine blade shroud segments to said turbine blades;
a stationary seal surrounding said turbine blade rows to reduce the amount of steam that passes around said turbine blades;
means for measuring the clearance between said stationary seal and each of said shroud segments a number of times along each shroud segment under dynamic conditions;
means for averaging said measurements to produce an average clearance value for each shroud segment;
means for analyzing said average clearance values for each shroud segment to determine when the clearance between a shroud segment and said stationary seal is approaching a critical value; and
means for developing control signals in response to said means for analyzing.

19. A method for monitoring the clearance between a plurality of turbine blade shroud segments configured in a row and a stationary portion of a turbine, comprising the steps of:
measuring the clearance between the stationary portion of the turbine and each of the shroud segments a number of times along each shroud segment under dynamic conditions;
averaging said measurements to produce an average clearance value for each shroud segment;
analyzing said average clearance values for each shroud segment to determine when the clearance between a should segment and the stationary portion of the turbine is approaching a critical value; and developing control signals responsive to said step of analyzing.

20. The method of claim 19 wherein said step of analyzing includes the step of comparing each of said average clearance values to said average clearance values for the two adjacent shroud segments in the row.

21. The method of claim 19 wherein said step of analyzing includes the step of averaging all of said clearance values for the row to produce an average row clearance value which is compared to said average clearance value for each shroud segment 22. The method of claim 19 wherein said step of analyzing includes the step of comparing said average clearance value to a predetermined critical clearance value.

23. The method of claim 19 wherein said step of averaging includes the step of calculating said average clearance value for each shroud segment by discriminating between the measurements corresponding to various shroud surface characteristics.

24. The method of claim 19 additionally comprising the step of determining whether the row has shifted axially.

25. The method of claim 19 wherein said step of developing control signals includes the step of initiating turbine protective action in response to said step of analyzing.

26. The method of claim 25 wherein the step of initiating turbine protective action includes the step of generating operator alarms in response to said step of analyzing.

* * * * *